United States Patent [19]

Fritz et al.

[11] 4,233,319

[45] Nov. 11, 1980

[54] LOW DENSITY CHEWING GUM PRODUCT AND METHOD OF MAKING THE SAME

[75] Inventors: Douglas P. Fritz; Ronald J. Elias, both of Mountaintop, Pa.

[73] Assignee: Topps Chewing Gum, Incorporated, Brooklyn, N.Y.

[21] Appl. No.: 28,335

[22] Filed: Apr. 9, 1979

[51] Int. Cl.³ .............................................. A23G 3/30
[52] U.S. Cl. .......................................... 426/5; 426/3
[58] Field of Search ....................................... 426/3, 5

[56] References Cited

U.S. PATENT DOCUMENTS

| | | | |
|---|---|---|---|
| 2,290,120 | 7/1942 | Thomas | 426/3 |
| 3,020,164 | 2/1962 | Forkner | 426/5 |
| 3,262,784 | 7/1966 | Bucher | 426/5 |
| 3,912,817 | 10/1975 | Sapsowitz | 426/5 |
| 4,000,321 | 12/1976 | Mochizuki et al. | 426/5 |

*Primary Examiner*—Jeanette M. Hunter
*Attorney, Agent, or Firm*—Mark T. Basseches; Paula T. Basseches

[57] ABSTRACT

This invention is directed to an improved low density chewing gum or bubble gum product and method of making the same, characterized in that the same defines a matrix encompassing a network of gas filled cells, the density of the product being in the neighborhood of about 0.5. The invention further relates to a method of making said product which includes the steps of heating an essentially conventional gum formulation to a temperature at which the mass is a viscous liquid, whipping the mass, pouring the mass into molds, rapidly reducing the temperature of the mass while subjecting the same to vacuum and, after curing, removing the same from the molds.

21 Claims, No Drawings

LOW DENSITY CHEWING GUM PRODUCT AND METHOD OF MAKING THE SAME

The present invention is in the field of chewing gum products and more particularly pertains to a low density chewing gum product and method of making the same.

SUMMARY

The invention may be summarized as directed to a chewing gum product having unique appearance and initial chew characteristic and a method of making the same. More particularly, the present invention is directed to a low density chewing gum product having a cellular structure whose density, without limitation, is in the order of from about 0.4 to 0.6, as contrasted with a typical chewing gum formulation which has a density in the range of about 1.2 to 1.4.

The product has a unique initial chew characteristic which may vary in accordance with the composition and method of processing the same from a resilient consistency not unlike the consistency of a stiff marshmallow to a crumbly consistency not unlike a stale sponge cake. After initial chewing, the gum reverts to a consistency typical of a conventional chewing gum product after it has been initially chewed.

The invention further relates to a method of making a chewing gum composition as hereinabove described which includes the steps of formulating a chewing gum composition as a liquid batch, whipping the batch to incorporate gaseous material thereinto, which gaseous material is preferably inert, i.e. carbon dioxide, nitrogen or the like, to reduce oxidation effects, whipping being preferably carried out to an extent which reduces the density of the gum by about 10% or more.

The thus formulated composition is poured into molds of a desired shape and subjected to a vacuum environment and cooled. The vacuum will expand the gum mass to approximately three or more times the density of the initial starting composition and will also function to remove moisture.

The combined effects of cooling and moisture removal will render the composition, after a period of time in the vacuum chamber, self-sustaining and provide the desired low density chewing gum product. The self-sustaining nature of the product is believed to be achieved as a result of the combined effects of cooling, moisture removal and, where a gelling agent is embodied in the product, the solidifcation of such agent.

In accordance with a preferred embodiment of the invention, whipping of the molten gum composition is accompanied by the addition of a quantity of dry ice snow.

Accordingly, it is an object of the invention to produce a low density chewing gum product having unique initial chew characteristics and a method of making the same.

A further object of the invention is the provision of a chewing gum composition and method of making the same wherein the resultant product is of a spongy texture having a high bulk to weight ratio, the texture of the finished product ranging from a resilient, marshmallow consistency at one extreme, to an integral but crumbly porous consistency at the other.

In accordance with the invention, a chewing gum or bubble gum formulation of essentially conventional nature is initially prepared in accordance with standard procedures. By way of example and without limitation, there are noted below three typical chewing gum or bubble gum formulations:

| FORMULA I | |
| --- | --- |
| Gum Base | 10.0–35.0% by weight |
| Sugars | 55.0–90% |
| Glucose (corn syrup) | 15.0–30% |
| Flavors | 0.1–2.0% |

| FORMULA II | |
| --- | --- |
| Gum Base | 10.0–35% by weight |
| Sorbitol | 55.0–90% |
| Sorbitol Solution (70% Sorbitol - 30% water) | 0–30% |
| Glycerine | 1–10% |
| Flavors | 0.1–2.0% |

| FORMULA III | |
| --- | --- |
| Gum Base | 10.0–35% by weight |
| Sorbitol | 40.0–80% |
| Mannitol | 8.0–25.0% |
| Sorbitol Solution (70% Sorbitol - 30% water) | 10.0–30% |
| Flavors | 0.1–2.0% |

As is known, the formulations noted are prepared by first melting the gum base at heats ranging from about 160°–210° F. (71°–99° C.), adding the liquid components (corn syrup or sorbitol solution), thereafter dissolving the sugar components in the mass while mixing and adding the desired amounts of flavorants and colorants. As a practical matter and in view of the inclusion in the mass of certain amounts of oxygen, it is desirable to employ coloring and flavoring compositions which are resistant to oxidation.

The gum base selected is non-critical and may include chicle, balata, elastomers, waxes, resins, gums, etc., and admixtures thereof. Obviously, the gum base will be selected in accordance with the intended end chew characteristic, e.g. a bubble gum will incorporate high percentages of elastomers.

Likewise, the sugar concentrations may be modified in accordance with the tastes of the consumer in mind, children's gums normally incorporating larger sugar proportions than so-called adult gum products.

The formulated chewing gum composition may be stored and reheated when desired for further processing as hereinafter noted, or may be directly processed from the molten condition.

In accordance with a preferred practice of the invention, to 600 parts by weight of any of the above noted formulations there is added 17 parts by weight of a gelatin solution (70% water—30% gelatin (200 bloom)). The mass is whipped at high speed for about three minutes while being maintained at a temperature of about 180° F. ( 82° C. ). About 1 part by weight of glycerine is slowly added and the mixture whipped for three additional minutes.

The mixing procedures noted above are preferably carried out in a nitrogen atmosphere to minimize inclusion of atmospheric oxygen.

As a result of the whipping procedure, the density of the mass is reduced by about 10% as a result of included gaseous materials.

By way of example and without limitation, a procedure for satisfactorily whipping the mass on a laboratory scale is effected by employing a Hobart Mixer, Model K-5A, utilizing a whipping blade (approximately 5" diameter), operating at a speed of from 200 to 300 rpm.

The whipped material is poured into a mold, the volumetric capacity of which is approximately three to four or more times the volume of material added to the mold to allow for the expansion of the material. The mold is placed under vacuum of from 10 to 30" of mercury and is quick-chilled through the use of dry ice, liquid nitrogen or other suitable refrigerating procedures down to a temperature of about 90°–100° F. (32°–38° C.).

The vacuum condition is maintained until the gum has set. The period of maintenance in vacuum will vary, depending upon a number of factors such as gum formulation, surface exposure, degree of vacuum, refrigerating treatment and the like, it being generally necessary to maintain the vacuum environment for approximately 24 hours.

Faster "setting" and reduced utilization of the vacuum equipment may be achieved by increasing the quantity of gelling agent, such as gelatin (appropriate alginates or starches being satisfactorily substituted for the gelatin). Where gelatin is employed, its concentration is desirably maintained within the range of from about 0.5 to 5%, the lower end of such range requiring more extended vacuum periods and the use of the gelatin at the upper end of the range resulting in the production of a finished product having a somewhat undesirable crystalline texture.

Where it is desired to produce a softer, more malleable, marshmallow-like product, the gelatin or gelling agent may be completely eliminated and higher concentrations of glycerine employed. The noted, highly resilient, essentially gelatin-free product may be produced by increasing the percentage of glycerine to the range of about 2–10%.

After "setting", the product may be removed from vacuum and stripped from the molds, and is ready for use.

The finished product will evince a density of from about 0.3 to 0.5 and as high as 0.9 in contrast to a typical chewing gum product whose density will normally range from about 1.2 to about 1.4.

The products emerging from the vacuum chamber will incorporate substantially lowered moisture contents as a result of the vacuum procedures.

The ability of the product to retain its expanded shape is considered to be the conjoint result of loss of moisture and cooling of the gum, both of which result in partial crystallization of the sugar, stiffening of the gum base and, where the same is employed, a setting of the gel system.

Expansion of the product occurs almost immediately following the drawing of the vacuum but the product becomes self-sustaining under ambient conditions only after the "setting" effects noted.

In accordance with the above formulations, a chewing gum composition in its liquid state will incorporate a moisture content (unbound water) of about 3 to 4%. After termination of the vacuum process, the finished product will incorporate a moisture content of from about 0.5 to 1.4%. The resultant product, by virtue of its low density and consequent relatively large surface area, is desirably packaged in a hermetically sealed condition so as to minimize further moisture loss. While such additional moisture loss will not affect the safety of the product, it will result in a change in the initial chew texture thereof in that the resiliency of the product will be reduced.

In accordance with a further embodiment of the invention, a product having increased shelf life without the necessity for special packaging may be provided by formulating the gum in a unique manner wherein a high percentage of the normal moisture content of the gum is replaced by glycerine. By way of example, a chewing gum formulation may be fabricated as follows:

| FORMULA IV | |
| --- | --- |
| Dextrose | 50% by weight |
| Sugar | 20% |
| Gum base | 20% |
| Glycerine | 5% |
| Starch Hydrolysate | 4% |
| Colorant | .02% |
| Flavorant | .7% |

The ingredients are combined in a Sigma blade mixer preheated to about 150° F. (65.5° C.). Premelted gum base and colorant are added to the mixer and the batch mixed for approximately 2 minutes. Thereafter a blend comprised of the glycerine and starch hydrolysate is added and mixed with the other ingredients for about 2 minutes.

After the mixing is completed, the dextrose is added slowly during continued mixing for a period of about 10 minutes or such additional time as is necessary to assure complete distribution of the dextrose. Sugar is thereafter added and mixing is continued for another 2 minutes, following which the flavorant is added and the composition again mixed for 5 minutes.

The thus compounded chewing gum formulation is whipped and poured into the mold and subjected to cooling and vacuum as above described, it being noted that gelatin or a gelatine substitute need not be added.

The gum composition of the last mentioned embodiment has an initial moisture content in the neighborhood of about 0.6%, the moisture content being reduced approximately by one half as a result of the subjection to vacuum conditions for a period of 24 to 48 hours.

The low density gum fabricated in accordance with the last mentioned embodiment will exhibit a resilience comparable to or slightly stiffer than marshmallow and will evince a reduced tendency to depart from this consistency with aging as contrasted with other gum formulations having higher final moisture contents.

In accordance with a variation of the procedures for processing the four gum base formulations set forth above, and in order to produce an end product having a particularly low density, a quantity of dry ice snow, normally about 10% by weight of the weight of the gum composition, is added to the mass of material during the whipping procedure. Finished products having a density as low as 0.3 have been produced utilizing the dry ice additive. The procedure has the additional advantage that much of the entrained gaseous material is comprised of carbon dioxide.

As will be readily recognized, a substantial degree of variation of the formulations and processing steps may occur to those skilled in the art who are familiarized with the instant disclosure. Accordingly, the invention is to be broadly construed within the scope of the appended claims.

Having thus described the invention and illustrated its use, what is claimed as new and is desired to be secured by Letters Patent is:

1. The method of manufacturing a low density chewing gum product which comprises the steps of:
   heating a chewing gum composition to cause the same to liquefy;
   gasifying said molten gum mass to homogeneously introduce thereinto a gaseous component and reduce the density of said mass;
   introducing said gasified mass into a mold;
   introducing said gasified and molten mass in said mold to a vacuum environment to cause said mass to expand; and
   maintaining said mass in said expanded condition in said vacuum environment until the same becomes shape-retaining at ambient conditions of temperature and pressure.

2. The method in accordance with claim 1 and including the step of chilling said mass in said vacuum environment.

3. The method in accordance with claim 1 and including the step of maintaining said mass in said vacuum environment until the moisture content of said mass has been substantially reduced.

4. The method in accordance with claim 1 wherein said gasifying step is carried out to an extent to decrease the density of said mass by about 10% or more.

5. The method in accordance with claim 4 wherein said gasifying step is carried out by whipping said molten mass.

6. The method in accordance with claim 5 wherein said whipping step is carried out in an inert gas atmosphere.

7. The method in accordance with claim 5 and including the step of adding to said mass during the whipping thereof a quantity of solid carbon dioxide in comminuted form.

8. The method in accordance with claim 7 wherein the amount of solid carbon dioxide added to said mass constitutes about 10% or more of the weight of said mass.

9. The method in accordance with claim 1 and including the step of adding to said chewing gum mass a gelling agent.

10. The method in accordance with claim 9 wherein said gelling agent constitutes gelatin, said gelling agent being added in solution, the gelatin component of said additive being present in the range of from about 0.5 or more of the weight of the gum composition.

11. The method in accordance with claim 1 wherein said chewing gum composition incorporates about 2% by weight or more glycerin.

12. The method in accordance with claim 11 wherein said chewing gum composition, upon setting, incorporates less than about 0.4% unbound moisture.

13. The method in accordance with claim 12 wherein the glycerine is present in the range of about 5% by weight.

14. The method of manufacturing a low density chewing gum product having extended shelf life and a resilient initial chew characteristic which comprises the steps of:
   providing a chewing gum composition including gum base, sweetener and glycerine, said glycerine being present in the amount of from about 2% to 10% by weight;
   heating said composition to liquefy the same;
   gasifying said molten gum base with an inert gas to homogeneously introduce thereinto a gaseous component and reduce the density of said mass;
   introducing said gasified molten mass into a mold to cause said mass to expand and assume configurations of said mold; and
   maintaining said mass in said expanded condition in said mold until the unbound moisture content of said mass is reduced to below 1% and said mass becomes shape-retaining at ambient conditions of temperature and pressure.

15. The method in accordance with claim 14 wherein the unbound moisture content of said mass is reduced to below about 0.6%.

16. A low density chewing gum product having an inert-gas filled cellular structure and having the configuration of a mold made in accordance with the method of claim 14.

17. A low density chewing gum product having an inert-gas filled cellular structure and having the configuration of a mold made in accordance with the method of claim 15.

18. The method of manufacturing a low density chewing gum product which comprises the steps of providing a heat meltable chewing gum composition, heating said chewing gum composition to cause the same to liquefy, gasifying said molten chewing gum composition with an inert gas homogeneously to introduce therein a gaseous component and reduce the density of said mass, introducing said gasified mass into a mold, causing said mold incorporating said gasified molten mass to be subject to a vacuum environment to cause said mass to expand and assume configurations of said mold, and maintaining said mass in said expanded condition in said vacuum environment until the same becomes shape retaining in said configuration at ambient conditions of temperature and pressure.

19. The method in accordance with claim 18 and including the step of chilling said mass while in said vacuum environment.

20. A shaped low density chewing gum product having gas filled cells made in accordance with the method of claim 18.

21. A shaped low density chewing gum product having gas filled cells made in accordance with the method of claim 19.

* * * * *